UNITED STATES PATENT OFFICE.

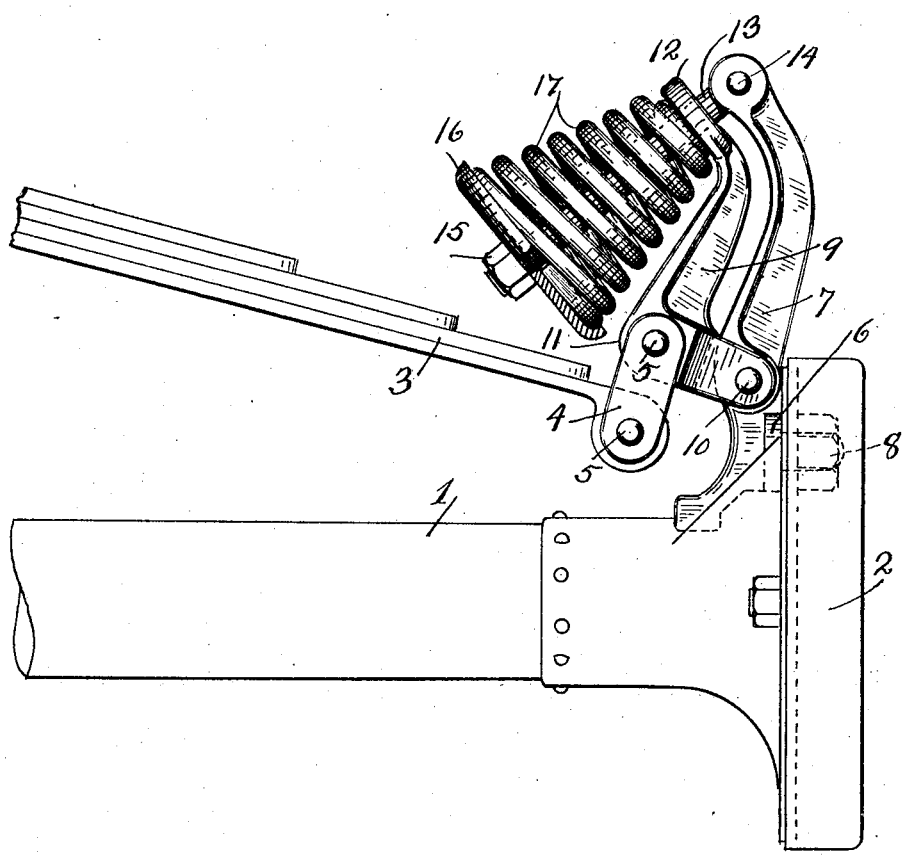

EMIL R. DRAVER, OF RICHMOND, INDIANA.

SHOCK ABSORBER.

1,412,461.  Specification of Letters Patent.  Patented Apr. 11, 1922.

Application filed March 12, 1921. Serial No. 451,698.

*To all whom it may concern:*

Be it known that I, EMIL R. DRAVER, a citizen of the United States, residing at Richmond, in the county of Wayne and State of Indiana, have invented certain new and useful Improvements in Shock Absorbers; and I do hereby declare the following to be a full, clear, and exact description of the invention, such as will enable others skilled in the art to which it appertains to make and use the same.

My invention has for its object to provide an extremely simple and highly efficient shock absorber or auxiliary spring attachment for vehicle springs, and to such ends, generally stated, the invention consists of the novel devices and combinations of devices hereinafter described and defined in the claims.

This shock absorber or attachment is capable of very general use, especially in connection with the leaf springs of automobiles or motor-propelled vehicles, but is particularly adapted for application to the body springs of Ford cars and, in the single view of the drawing, is shown as so applied.

In said drawing, the numeral 1 indicates the rear axle casing, the numeral 2 one of the brake drums, and the numeral 3 the rear semi-elliptical or leaf spring, such as found in a Ford car. In the customary Ford arrangement, the ends of the spring 3 are connected by links 4 and bolts 5 to so-called perches that are bolted to lugs 6 on the heads of the casing 1. In the application of my improved shock absorbers, the customary perches are removed, and in their stead, anchor brackets 7 are applied to the heads of said casing. As shown, these brackets 7 have bases that fit closely against the casing, and are provided with nut-equipped studs 8 by which they are rigidly but detachably secured to the lugs 6. The engagement of base of bracket 7 with axle casing forms a brace and relieves stud 8 from excessive strains.

The numeral 9 indicates a lever that is pivotally connected to the lower intermediate portion of the bracket 7 by a bolt 10. This lever 9 is approximately L-shaped, being formed with an intermediate elbow 11, and, at its free end, with a centrally perforated head that affords a spring cap 12. The upper ends of the hanger links 4, in this arrangement, are pivotally connected to the elbow 11 of the lever 9 by the upper bolts 5, so that the ends of the spring 3 are suspended below the respective levers 9.

A spring-supporting rod 13 is pivotally connected at its upper end to the upper end of the bracket 7 by a bolt or pin 14, and, at its threaded lower end, is provided with a nut 15. The numeral 16 indicates a disk-like spring base placed on the rod 13 and against the nut 15. The rod 13 passes freely through the perforated head or spring cap 12 of the lever 9. The numeral 17 indicates a tapered conical spring which surrounds the rod 13 and is compressed between the spring base 16 and spring cap 12.

With the arrangement described, as is evident, the weight carried by the spring 3 will be transmitted to the bracket 7 through the lever 9 and springs 17, so that the latter operate as auxiliary springs and very greatly increase the resilience of the spring suspension of the vehicle. The tension of the springs 17 can be varied by adjustments of the nut 15. The bolt 13 works freely through the head or spring cap 12, but holds said bolt always in proper working position.

The parts of the shock absorber or attachment are so designed that, when assembled, they are in very closely associated relation and take up but little space. Attention is also called to the important fact that the shock absorbing or auxiliary spring is not, in any way, attached to the intermediate portion of the main spring 3, and therefore leaves the latter free to operate in the usual way. Otherwise stated, the shock absorbing attachment adds resilience to the main spring without changing the action of the former, in itself, or decreasing its resilience and, moreover, without carrying any of the load back onto said main spring. Moreover, the device can be easily and quickly attached to the car.

Of course, a shock absorber, such as shown in the drawing, will be applied to both ends of the main spring, that is, at both sides of the car. To prevent side sway, the links 4, at one side, might be rigid with the co-operating lever 9, or otherwise stated, might be integral parts thereof. This would cause the links 4, on the opposite side of the car, to take up all of the lateral movement produced by compression of the main spring 3. It will be noted that the lever 9, in the arrangement illustrated in the drawings, operates as a lever of the second class, with its fulcrum at 10, the weight at 5 and lifting power at 12. This is decidedly the best possible arrangement of said lever, because it makes possible the assembling of the parts in compact relation, as shown, but, nevertheless, said lever, as well as the other parts, might be of other or modified forms.

What I claim is:

1. The combination of a main spring and a relatively fixed anchoring bracket, of a lever pivoted to said bracket at one end and having a spring cap at its other end, a spring supporting rod attached to said anchoring bracket and working through the spring cap of said lever, a spring base anchored to the extended end of said rod, and an auxiliary spring compressed between said spring cap and spring base, said main spring being connected to said lever and transmitting thereto force that will compress said auxiliary spring.

2. The combination with a main spring and a relatively fixed anchoring bracket, of a lever pivoted to said bracket at one end and having a spring cap at its other end, a spring-supporting rod pivoted to the extended end of said bracket and working freely through the spring cap of said lever, a spring base anchored to the extended end of said rod, and a coiled spring compressed between said spring base and spring cap, the end of said main spring being connected to the intermediate portion of said lever.

3. The combination with a main spring and a relatively fixed anchoring bracket, of a lever pivoted to said bracket and provided at its free end with a spring cap, said lever having an offset intermediate elbow connected to the adjacent end of said main spring, a spring-supporting rod pivotally connected to the extended end of said bracket and working freely through the spring cap of said lever, a spring base anchored to the extended end of said rod, and a coiled spring compressed between said spring base and spring cap.

4. The combination with a main spring and a relatively fixed anchoring bracket, of a lever pivoted to said bracket and provided at its free end with a spring cap, said lever having an offset intermediate elbow connected to the adjacent end of said main spring, a spring-supporting rod pivotally connected to the extended end of said bracket and working freely through the spring cap of said lever, a spring base adjustably anchored to the extended end of said rod, and a coiled spring surrounding said rod and compressed between said spring base and said cap.

5. The combination with a main spring and a relatively fixed anchoring bracket, of a lever pivoted to said bracket and provided at its free end with a spring cap, said lever having an offset intermediate elbow connected to the adjacent end of said main spring, a spring-supporting rod pivotally connected to the extended end of said bracket and working freely through the spring cap of said lever, a spring base adjustably anchored to the extended end of said rod, and a coiled spring compressed between said spring base and spring cap.

6. The combination with a main spring and a relatively fixed anchoring bracket, of a lever pivoted to said bracket at one end and having a spring cap at its other end, a spring-supporting rod pivoted to the extended end of said bracket and working freely through the spring cap of said lever, a spring base anchored to the extended end of said rod, and a tapered coiled spring surrounding said rod and compressed between said spring base and spring cap, the end of said main spring being connected to the intermediate portion of said lever.

In testimony whereof I affix my signature.

EMIL R. DRAVER.